United States Patent Office 3,432,392
Patented Mar. 11, 1969

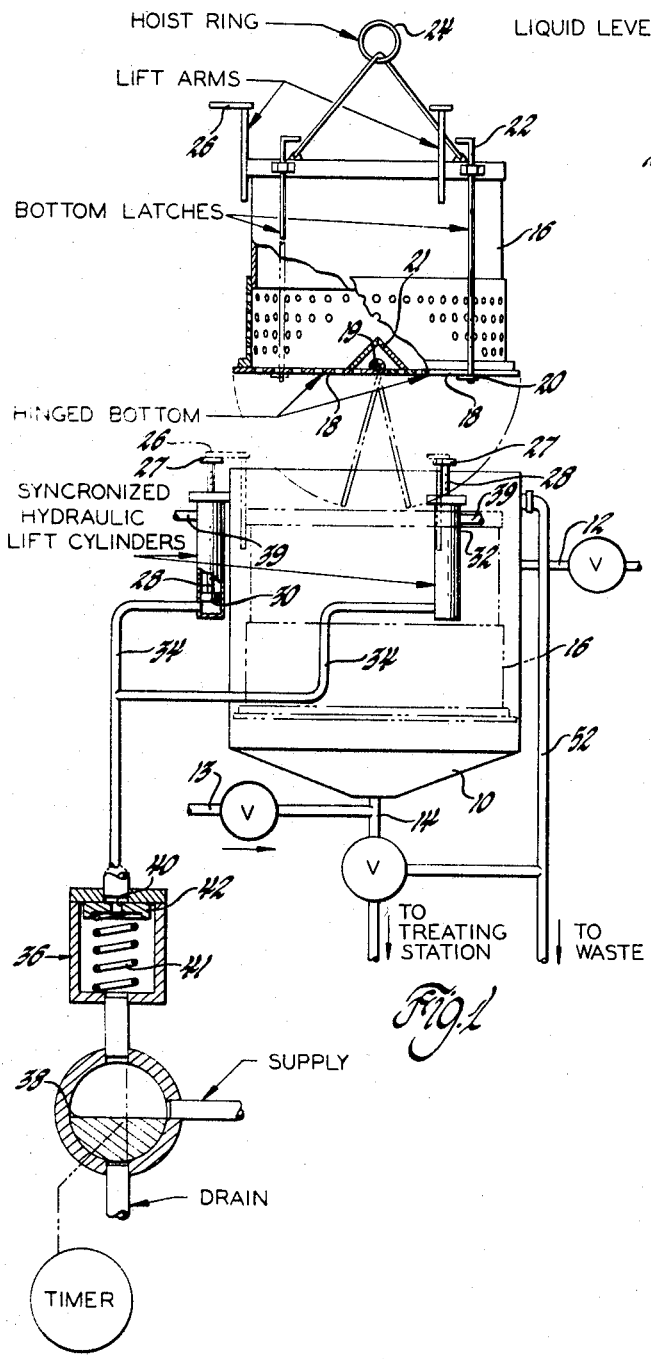

3,432,392
METHOD AND APPARATUS FOR MAKING COLLAGEN ARTICLES
Leroy Bruce Cranstoun, Trenton, N.J., assignor to Ethicon, Inc., a corporation of New Jersey
Filed Apr. 26, 1963, Ser. No. 276,016
U.S. Cl. 195—6  4 Claims
Int. Cl. C12d 13/06

This invention, in one aspect, relates to a process for forming shaped articles from collagen. Examples of these articles are surgical aids such as sutures, sheets, tubing and sponges, also edible sausage casings.

In this process the invention more particularly relates to a method and apparatus which is of advantage in preparing collagen from animal tissue, for example beef tendons. It is particularly, but not exclusively, suitable for the treatment of thin slices of beef tendon with various liquids, for example an enzyme to remove non-collagenous material from the tendon tissue.

Other aspects of the invention relate to an improved process and apparatus for treating large numbers of any small particles with various liquids while agitating the particles, and not confined to producing collagen.

In the patent to Klevens and Nichols, 2,919,998, issued Jan. 5, 1960, the disclosure of which is incorporated herein by reference, there is shown a process and apparatus for making shaped articles of a homogenous collagen dispersion. Beef tendon is a suitable starting material. It is proposed to treat thin slices of beef tendon with an enzyme solution to dissolve and remove elastin contained in the tendon.

One object of my invention is to provide an improved method and apparatus for treating such slices with an enzyme solution in a process, for example as disclosed in the Klevens patent.

Another object of the invention is to provide an improved method and apparatus for treating particles of a material with a liquid generally and especially to provide an improved method and apparatus for agitating such particles in the liquid without cumulative or prolonged rotation, that is prolonged rotation in the same sense or direction, which might tend to orient or pack the particles.

For example in the treatment with an enzyme of thin slices of beef tendon as is disclosed in the Klevens patent, it is important to expose the slices of tissue to the enzyme solution over long periods of time. This may be of the order of ten to twenty hours. It is important that the slices of tissue be kept separated and that matting, packing and adhering together be prevented, both in order to prevent the accumulation of a large mass which is difficult to handle, and in order to expose the slices as uniformly as possible to the action of the enzyme. This requires agitation of the particles in the enzyme solution and it is important that the agitation be gentle, and without significant turbulence at the surface. Turbulence beneath the surface of the solution is desirable but it is important that the slices be kept submerged and not allowed to reach the surface and that the surface of the liquid itself be kept smooth and not agitated. Such surface exposure and agitation causes aeration of the solution which oxidizes the enzyme and destroys it.

Preferably the slices should be kept separate from one another in the enzyme solution over long periods of time. The tendon tissue is of greater specific gravity than the enzyme solution so that the tissues tend to sink to the bottom of the treating container. It is desirable to redistribute them through the container periodically to prevent settling together at the bottom of the container which tends to prevent uniform action of some types of treating liquids.

One specific object of my invention is to provide an improved method and apparatus which are especially, although not exclusively, adapted to overcoming the above mentioned difficulties by exposing large numbers of individual thin slices of tendon to the action of an enzyme liquid while frequently separating the slices and while gently agitating the slices to produce gentle flow of liquid through the group of slices and around individual slices.

Other objects and advantages of the invention will be apparent from the following description and accompanying drawings, which disclose, for example and not by way of limitation, one preferred form of the invention.

In the drawings:

FIG. 1 is a schematic exploded elevation, partly in section, of one form of apparatus embodying the invention, a treating container being shown elevated above the top of a treating tank in which it operates, and FIGS. 2 to 4 are diagrammatic vertical sections showing the container in different positions in the treating tank and showing the treated particles in different conditions in the container.

Referring to the drawings, one form of apparatus by which my process can be carried out includes a tank 10 for holding any suitable enzyme solution or other treating liquid. The liquid may be supplied to the tank by an inlet 12 or 13 and drained therefrom by a drain 14. Thin slices of animal tendon from 15 to 30 mils thick, for example as disclosed in the Klevens patent referred to, or other material to be treated, can be placed in a circular basket or container 16 having the upper portion of its side wall imperforate and the lower portion perforated. The basket has a hinged perforated bottom preferably formed by two semicircular halves 18 pivoted to each other and to the perforated side wall of the basket at a pivot line 19. The pivot is covered by a perforated shield 21 to eliminate irregular effective perforations in the bottom caused by the hinge. The shield is perforated to match the perforations in the bottom halves 18. The halves 18 are held horizontal to close the basket by two or more rotatable latches 20 operated by rods having handles 22 above the top of the basket. The basket can be raised out of the tank 10 and lowered into the tank by any suitable means such as the hoist ring 24.

In use the basket is supported in the tank by any suitable number of lift arms 26 resting on, or attached to, pads 27 attached to the tops of piston rods 28 connected to pistons 30 in hydraulic cylinders 32 fastened to the sides of the tank 10. The cylinders exemplify any known or suitable means for raising the basket slowly and lowering it quickly. In one such arrangement, for example the cylinders may be supplied with pressure fluid below the pistons by conduits 34 through a slow supply, quick-drain check valve 36 and a selective supply or exhaust valve having a core 38. Whenever the valve 38 is open as shown in FIG. 1 to supply the cylinders, pressure fluid from the supply pipe flows slowly through a small orifice 40 in a check valve disc 42 normally seated by a light spring 41. This raises the basket slowly in the tank. Thereafter when the valve core 38 is rotated counter-clockwise through 90 degrees to the position indicated by phantom lines, the supply to the cylinders is closed and the cylinders are drained or exhausted. The pressure fluid flows rapidly from the cylinders because the pressure due to the weight of the basket unseats the check valve 42 against the spring 41 to provide a large drain opening. This allows the basket to sink rapidly through the liquid in the tank due to its own weight. Alternatively the basket may be forced down rapidly by power devices, such as by admitting pressure fluid above the pistons, as by conduits 39 while the cylinders below the pistons are being drained.

Using a plurality of lift cylinders which act as supports for the basket is particularly advantageous because this prevents rotation of the basket as it rises and falls, and such rectilinear motion tends to control turbulence. I use the term rectilinear motion to mean that each part of the basket moves in a straight line, so that the basket does not rotate while rising.

In using this apparatus, for example with slices of beef tendon in an enzyme solution, the tank 10 may be filled to the proper level with solution and the proper quantity of slices 50 put in the basket. The basket may then be lowered into the solution until the lift arms rest on the pads 27 of the cylinders 32. The slices of animal tendon are of slightly greater specific gravity than the enzyme solution so that they tend to sink slowly through the solution. However when the basket is first lowered into the position shown in FIGS. 2 and 4, the liquid flows rapidly from the tank into the basket through the perforations and the currents of liquid carry the group of slices up toward the top of the liquid into the position shown in FIG. 3 and agitate the slices and liquid at the same time. The slices 50 are now separated. The group is in the position of FIG. 3 in the tank, but the basket is down in the position of FIGS. 2 and 4. The basket is left down for a period of time during which the slices gradually sink toward the bottom as indicated in FIG. 2. At this point and preferably before the slices have an opportunity to mat or become packed, or even to settle into contact with each other, the basket is slowly raised by supplying fluid pressure to the cylinders as described above until the basket and slices are in the position of FIG. 3. As the basket is being raised some liquid flows through the perforated bottom and side, and some is carried bodily in the basket up through the ring of liquid in the tank outside the basket. This tends to raise the level of liquid in the basket above the level in the tank outside the basket, and this produces flow from inside the basket through the perforations to the tank outside the basket. The rate of lifting the basket is so slow that as a practical matter the level in the basket is substantially the same as outside, and the flow through the perforations is very slow. The liquid carried up keeps the slices suspended and carries them to the top of the tank into the position shown in FIG. 3, while the liquid that flows through the perforations flows through the group and around the individual slices. The flow out of the basket unavoidably tends to carry the slices toward the bottom and toward the side. The liquid flows laterally or horizontally between the slices, which reduces the tendency of the slices to come close together as the basket approaches the position of FIG. 3. When the basket has reached the top position shown in FIG. 3 the cylinders are suddenly drained or exhausted and, if desired, pressurized above the pistons so that the basket moves quickly to the bottom position shown in FIG. 4. This temporarily raises the liquid level outside the basket to a substantial height above the liquid level in the basket and provides a head which rapidly forces liquid back into the basket through the perforations as indicated by the arrows in FIG. 4. This reverse flow dislodges from the side and bottom any slices which have become lodged there. It also quickly increases the depth of free liquid below the slices by flowing the slices into the position of FIG. 3 while the basket remains down as in FIGS. 2 and 4. The flow also separates and agitates the slices beneath the surface of the liquid, which within the basket has remained substantially above the slices as shown in FIG. 3. Simultaneous flow of liquid radially inward through the side of the basket, and upward through the bottom, increases the vertical spacing of the slices, particularly if they have been left sinking long enough to concentrate somewhat on the bottom. After the liquid level inside and outside the basket has subsequently equalized, the reverse flow stops, the agitation stops and the slices tend to sink toward the bottom. The sinking is interrupted by starting the slow elevation of the basket and the process is repeated as above described until the slices have been exposed to the solution for the desired length of time.

When this invention is used in the treating of slices of tendon in an enzyme, for example as disclosed in the Klevens patent, it has been found advantageous to have the bottom and preferably the lower portion of the side wall uniformly perforated. The perforated portion of the side wall may extend from a quarter to about half the height of the basket. It is of advantage to have the upper portion of the side wall imperforate to prevent rapid lateral flow of liquid which would divert the liquid from flowing through the group of slices. Preferably the perforated portion of the side wall extends approximately to the level of the liquid in the tank when the basket is in its uppermost position and the imperforate part of the wall extends above the level of liquid in tank 10 at all times. It has been found advantageous to uniformly perforate the lower section of the side wall and the bottom with holes having a diameter of approximately 0.045" spaced so that the holes occupy about one-third of the area.

Some of the advantages of the invention can be realized by perforating only the bottom of the basket, provided the flow rates are maintained as described above. Also some of its advantages may be realized by perforating only the side. However it is preferable to perforate both the bottom and the lower quarter, at least, of the side, for in this case better turbulence below the surface and better vertical separation of the particles is achieved, particularly when the basket is rapidly lowered to the position of FIG. 4.

At appropriate times, or continuously, during the process any fat liberated from the tissue by the enzyme may be floated off the top of the tank to waste through overflow pipe 52. The level of liquid in the tank is raised to, or maintained at, the requisite height by admitting liquid to the tank in any suitable manner, for instance through supply pipes 12 or 13.

After the requisite exposure of the tissue to the enzyme, the enzyme may be neutralized and the enzyme solution drained to waste through pipes 14 and 52. The basket is then raised to the position shown in FIGURE 3, and the tendon slices washed with demineralized water to remove most of the residual enzyme solution. The latches 20 may then be opened to allow the hinged bottom to drop to the position shown in phantom lines in FIGURE 1. The enzyme treated slices flow, with the assistance of a flushing hose if desired, from the basket into the tank 10, from which it may be drained through the valve V to a treating station separate from the tank 10, with the assistance of additional flushing liquid.

The slow lifting of the particles while suspended in liquid, followed by their slow descent after the basket is quickly lowered, provides a gentle rectilinear agitation which avoids rotation and swirls which might reach the surface of the liquid, and the avoidance of which is one of the objects of the invention. Rotational agitation tends to produce turbulence which both tends to bring particles together and to entrain oxygen in the enzyme, both undesirable in this process.

As a particular example of one way of carrying out my process, the basket may be raised from three to six inches in fifteen to eighteen seconds, then let down as quickly as it will sink under its weight or may be forced down by power. The particles may then be left to drift down in the liquid for about forty-five to forty-eight seconds. Within these limits a cycle of about a minute, repeated for about seventeen hours, has been found effective with slices of beef tendon from fifteen mils to thirty mils thick in various known enzyme solutions.

It is to be understood that the foregoing disclosure and the terminology used therein, are for example only and do not constitute a limitation of the invention.

What I claim as my invention is:

1. In a process for the extrusion of a homogeneous collagen dispersion to form a shaped article, the improvement which comprises suspending an open group of separated particles of animal tendon tissue at an agitating station in enzyme liquid whose specific gravity is less than the specific gravity of the tissue, while confining the group horizontally in a space containing only a portion of the liquid and while limiting the free liquid in said portion below the particles and while restricting the rate of flow of liquid from the confined space to the remainder of the liquid; then cyclically repeating the following steps: raising the group suspended in liquid at a speed sufficiently low to prevent substantial packing of the suspended particles, then quickly increasing the depth of free liquid below the group so that the suspended particles sink gradually through the liquid, then arresting the sinking of the suspended particles, and then raising the group suspended in liquid as aforesaid; and subsequently transferring the tissue to a treating station.

2. In a process for the extrusion of a homogeneous collagen dispersion to form a shaped article, the improvement which comprises suspending an open group of separated particles of animal tendon tissue at an agitating station susbtantially below the level of enzyme liquid whose specific gravity is less than the specific gravity of the tissue, while confining the group horizontally in a space containing only a portion of the liquid and while limiting the free liquid in said portion below the particles and while restricting the rate of flow of liquid from the confined space to the remainder of the liquid; then cyclically repeating the following steps: reducing the depth of liquid above the group by flow of liquid from the confined space between the particles to the remaining liquid at said restricted rate, then quickly increasing the depth of free liquid below the group so that the suspended particles sink gradually through the liquid, then arresting the sinking of the suspended particles, and then reducing the depth of liquid above the group as aforesaid; and subsequently transferring the tissue to a treating station.

3. In a process for the extrusion of a homogeneous collagen dispersion to form a shaped article, the improvement which comprises suspending an open group of separated particles of animal tendon tissue in enzyme liquid whose specific gravity is less than the specific gravity of the tissue, while confining the group horizontally in a space containing only a portion of the liquid and while limiting the free liquid in said portion below the particles and while restricting the maximum rate of flow of liquid from the confined space to the remainder of the liquid; and then cyclically repeating the following steps: raising the group suspended in liquid at a speed sufficiently low to prevent substantial packing of the suspended particles, then quickly increasing the depth of free liquid below the group so that the suspended particles sink gradually through the liquid, then arresting the sinking of the suspended particles and then raising the group suspended in liquid as aforesaid.

4. In a process for the extrusion of a homogeneous collagen dispersion to form a shaped article, the improvement which comprises suspending an open group of separated particles of animal tendon tissue substantially below the level of enzyme liquid whose specific gravity is less than the specific gravity of the tissue while confining the group horizontally in a space containing only a portion of the liquid and while limiting the free liquid in said portion at a level below the particles and while restricting the maximum rate of flow of liquid from the confined space to the remainder of the liquid; and then cyclically repeating the following steps: reducing the depth of liquid above the group by flow of liquid from the confined space between the particles to the remaining liquid at said restricted rate, then quickly increasing the depth of free liquid below the group so that the suspended particles sink gradually through the liquid, then arresting the sinking of the suspended particles, and then reducing the depth of liquid above the group as aforesaid.

References Cited

UNITED STATES PATENTS

| 2,468,162 | 4/1949 | Black | 23—267 |
| 2,663,553 | 12/1953 | Booth | 23—267 |
| 2,724,392 | 11/1955 | Cooper | 134—141 X |
| 2,914,445 | 11/1959 | Clarke | 167—74 |
| 2,925,328 | 2/1960 | Romagnan | 23—267 |
| 2,973,302 | 6/1961 | Bloch et al. | 195—6 |
| 2,988,488 | 6/1961 | Robinson et al. | 195—6 |
| 3,064,629 | 11/1962 | Story | 134—141 X |
| 3,098,014 | 7/1963 | Denton et al. | 195—2 |
| 3,121,049 | 2/1964 | Nishihara | 195—6 |
| 3,203,868 | 8/1965 | Grimm | 195—6 |

OTHER REFERENCES

Tappel: Food Industries, vol. 22, No. 8, pages 87 and 88, August 1950.

ALVIN E. TANENHOLTZ, *Primary Examiner.*

U.S. Cl. X.R.

134—141